(12) United States Patent
Wang et al.

(10) Patent No.: US 12,158,137 B1
(45) Date of Patent: Dec. 3, 2024

(54) COIL PIPE DEVICE, LIQUID COOLING SYSTEM AND WIND TURBINE

(71) Applicant: GOLDWIND SCIENCE & TECHNOLOGY CO., LTD., Xinjiang (CN)

(72) Inventors: Liheng Wang, Beijing (CN); Jingyi Zhang, Beijing (CN); Xiaowen Zhou, Beijing (CN)

(73) Assignee: GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 0 days.

(21) Appl. No.: 18/687,619

(22) PCT Filed: Sep. 27, 2022

(86) PCT No.: PCT/CN2022/121763
§ 371 (c)(1),
(2) Date: Feb. 28, 2024

(87) PCT Pub. No.: WO2023/231249
PCT Pub. Date: Dec. 7, 2023

(30) Foreign Application Priority Data

May 31, 2022 (CN) .......................... 202210613931.3

(51) Int. Cl.
*F03D 80/60* (2016.01)
*F16L 3/01* (2006.01)
(52) U.S. Cl.
CPC .............. *F03D 80/602* (2023.08); *F16L 3/01* (2013.01)

(58) Field of Classification Search
CPC ................................ F03D 80/602; F16L 3/01
See application file for complete search history.

(56) References Cited

U.S. PATENT DOCUMENTS

| 4,540,202 A | 9/1985 | Amphoux et al. |
| 2007/0119185 A1 | 5/2007 | Pfannenberg |
| 2007/0228226 A1 | 10/2007 | Taillon et al. |
| 2010/0175773 A1 | 7/2010 | Stark |

FOREIGN PATENT DOCUMENTS

| CN | 209385291 U | 9/2019 |
| CN | 212390627 U | 1/2021 |
| CN | 113532147 A | 10/2021 |
| CN | 113670094 A | 11/2021 |
| WO | 2013156605 A1 | 10/2013 |

OTHER PUBLICATIONS

The International Search Report mailed Feb. 20, 2023; PCT/CN2022/121763.

*Primary Examiner* — Brian O Peters

(57) ABSTRACT

The present disclosure provides a coil pipe device, a liquid cooling system, and a wind turbine. The coil pipe device is used to support a hose, and is arranged between a first platform and a second platform spaced apart. The first platform is rotatable relative to the second platform. The coil pipe device includes a first support, a second support, and a cantilever support assembly, and the first support is fixed on the first platform; the second support is fixed on the second platform. The two ends of the cantilever support assembly are rotatably connected to the first support and the second support respectively, and the cantilever support assembly extends spirally. The cantilever support assembly can be twisted spirally with the rotation of the first platform relative to the second platform.

20 Claims, 4 Drawing Sheets

COIL PIPE DEVICE, LIQUID COOLING SYSTEM AND WIND TURBINE

CROSS-REFERENCE OF RELATED APPLICATIONS

This application is a National Stage of International Application No. PCT/CN2022/121763, filed Sep. 27 2022, which claims the benefit of and priority to Chinese patent application No. 202210613931.3, titled "Coil Pipe Device, Liquid Cooling System and Wind Turbine" and filed on May 31, 2022, the entireties of which are hereby incorporated herein by reference.

TECHNICAL FIELD

The present disclosure belongs to the field of wind power generation technology, particularly relates to a coil pipe device, a liquid cooling system, and a wind turbine.

BACKGROUND

As the power of high-power wind turbine continues to increase, liquid cooling for future wind turbine will become a development trend. Since the yaw rotation center of the nacelle and the center of the tower are occupied by twisted cables, it has become a technical challenge that how to transfer the coolant from the tower into the nacelle and achieve intercommunication between the nacelle and the yaw.

SUMMARY

The main purpose of the present disclosure is to provide a coil pipe device, a liquid cooling system, and a wind turbine to improve the operational reliability of the wind turbine.

For the above purposes, the present disclosure provides the following technical solutions:

In one aspect, the present disclosure provides a coil pipe device for supporting a hose, wherein the coil pipe device is arranged between a first platform and a second platform spaced apart, the first platform can rotate relative to the second platform, and the coil pipe device includes a first support, a second support, and a cantilever support assembly, the first support is fixed on the first platform; the second support is fixed on the second platform. The two ends of the cantilever support assembly are rotatably connected to the first support and the second support respectively, and the cantilever support assembly extends spirally.

In an exemplary embodiment of the present disclosure, the cantilever support assembly includes at least two support joints, and adjacent support joints can be rotatably connected with each other.

Optionally, the cantilever support assembly further includes an attaching pipe clamp for attaching the hose to the support joint, and each support joint is connected with at least one attaching pipe clamp.

Specifically, the attaching pipe clamp has an opening, which is arranged towards the supporting joint so that the attaching pipe clamp and the supporting joint enclose and form a hose accommodating chamber.

Furthermore, the adjacent supporting joints are pivotally connected through a pivot shaft.

Optionally, the adjacent support joints and the pivot shaft are pivotally connected in a form of hinge.

Optionally, the support joint includes a body and two bending parts, two bending parts disposed at two ends of the body along the spiral extension direction and bent towards the same side, respectively. The adjacent support joints are pivotally connected through the pivot shaft at the bending parts.

In another exemplary embodiment of the present disclosure, each bending part is provided with a notch for the hose to pass through.

Optionally, the pivot shaft includes at least two pivot shaft units spaced apart along its extension direction, and the notch is provided between adjacent pivot shaft units, so that the centerline of the hose can pass through the pivot shaft.

Specifically, each bending part is provided with two notches, which are spaced apart along the extension direction of the pivot shaft.

Optionally, the adjacent supporting joints are assembled with the bending parts bending in the same direction. Alternatively, the adjacent supporting joints are assembled with the bending parts bending in opposite directions.

In an exemplary embodiment of the present disclosure, the angle between each bending part and the body is between 110°-170°.

In another exemplary embodiment of the present disclosure, the first support is located above the second support, and the cantilever support assembly further includes a support seat. The support seat is rotatably arranged on the second support, and the support joint is rotatably connected to the support seat. A weight reducing hole is arranged in the middle of the support joint.

In another aspect, the present disclosure provides a liquid cooling system, which includes a cooling pipeline and a coil pipe device as described above. The cooling pipeline is attached to the cantilever support assembly and extends in the same direction as the cantilever support assembly.

In another exemplary embodiment of the present disclosure, the adjacent supporting joints are pivotally connected through a pivot shaft, which is approximately perpendicular to the cooling pipeline close to the pivot shaft.

Optionally, the cooling pipeline is a hose, which is a rubber hose or a silicone hose.

Specifically, the cooling pipeline includes an inlet pipe and a discharge pipe, and the inlet pipe and the discharge pipe extend substantially parallel to each other.

Furthermore, the inlet pipe and the discharge pipe are spaced apart along the extension direction of the pivot shaft. Alternatively, the inlet pipe and the discharge pipe are located on both sides of the same pivot shaft.

In another aspect, the present disclosure provides a wind turbine, which includes a tower, a nacelle located at the top of the tower, and a liquid cooling system as described above. The first platform is a nacelle platform connected to the nacelle, and the second platform is a tower platform connected to the tower, and the nacelle platform can rotate relative to the tower platform.

The coil pipe device, the liquid cooling system, and the wind turbine provided in the present disclosure have at least the following beneficial effects: the coil pipe device is provided with a cantilever support assembly for supporting the hose. The cantilever support assembly can twist spirally with the rotation between the first platform and the second platform, thereby avoiding pulling and squeezing deformation of the hose, and improving the service life of the hose.

BRIEF DESCRIPTION OF THE DRAWINGS

The above and/or other purposes and advantages of the present disclosure will become clearer through the description of embodiments in conjunction with the accompanying drawings, among which.

EXPLANATION OF REFERENCE SIGNS

10. First platform;
20. Second platform;
21. Second support;
30. Cantilever support assembly;
31. Support joint;
32. Pivot shaft;
33. Attaching pipe clamp;
34. Support seat;
35. Nut;
41. Inlet pipe;
42. Discharge pipe;
311. Body;
312. Bending part;
313. Notch;
314. Weight reduction hole.

DETAILED DESCRIPTION

Now the exemplary embodiments are described more comprehensively by referring to the accompanying drawings. However, it should not be understood that the embodiments disclosed in the present disclosure are limited to the embodiments described herein. The same reference signs in the figure represent the same or similar structures, therefore their detailed descriptions will be omitted.

In an aspect, the present disclosure provides a wind turbine, which includes a tower, a nacelle located at a top of the tower, and a liquid cooling system. The first platform 10 is a nacelle platform connected to the nacelle, and the second platform 20 is a tower platform connected to the tower. The nacelle platform can rotate relative to the tower platform.

In order to ensure the reliable operation of the wind turbine, the wind turbine further includes a heat dissipation system, and the liquid cooling system mentioned above can be a type of heat dissipation system. The liquid cooling system can cool down the generator and other components in the nacelle, avoiding local high temperatures and potential safety hazards.

As an example, the liquid cooling system can extend from the tower into the nacelle, which can include the nacelle platform and the generator disposed in the nacelle. As the wind direction changes, the impeller may change the pitch, and further drives the nacelle to rotate relative to the tower, that is, the nacelle platform rotates relative to the tower. At this time, the above liquid cooling system will be driven with the rotation of the nacelle platform.

Figure 1:
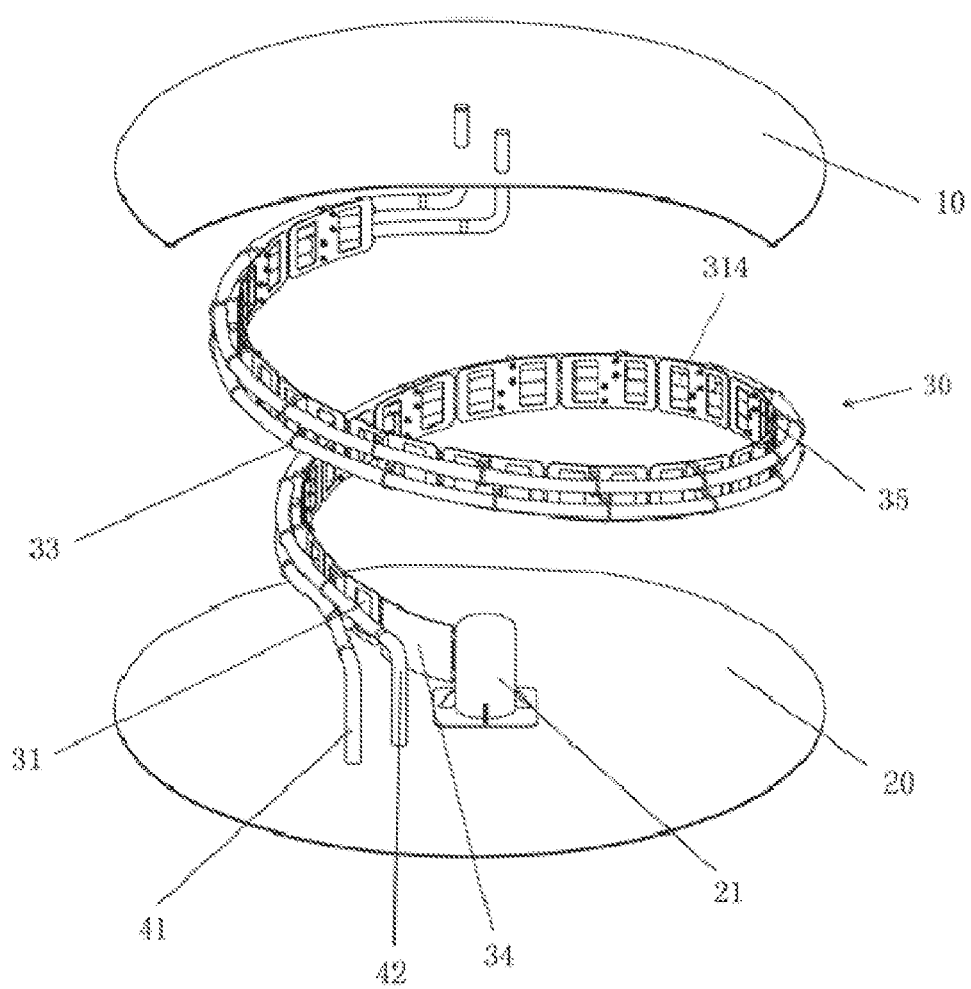
FIG. 1 is a partial structural diagram of a liquid cooling system provided in an exemplary embodiment of the present disclosure.
Figure 2:
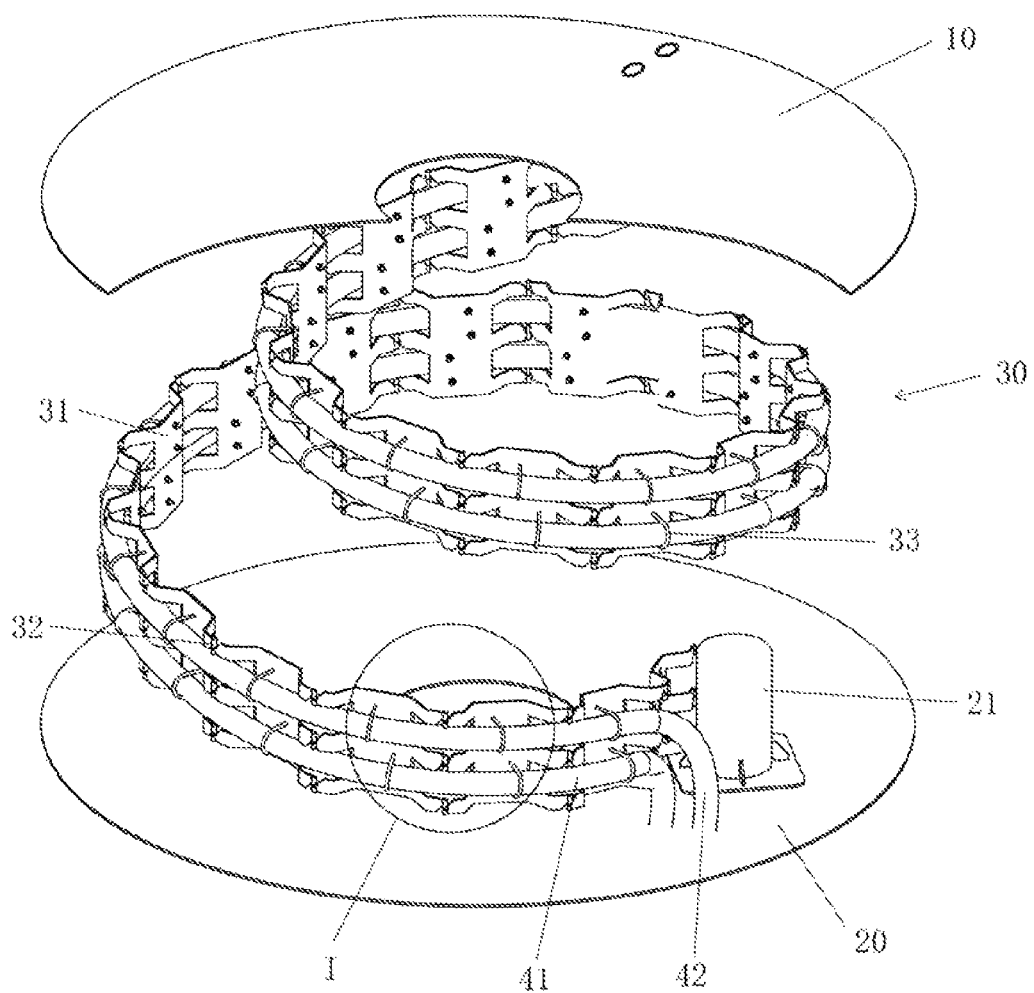
FIG. 2 is a partial structural diagram of a liquid cooling system provided in another exemplary embodiment of the present disclosure.

Referring to FIGS. 1-2, in order to adapt to the rotation of the nacelle platform, the present disclosure provides a coil pipe device for supporting a hose, such as but not limited thereto, a cooling pipeline.

The coil pipe device is arranged between the first platform 10 and the second platform 20 spaced apart, and the first platform 10 can rotate relative to the second platform 20. The coil pipe device includes a first support, a second support, and a cantilever support assembly, and the first support is fixed on the first platform 10; the second support 21 is fixed on the second platform 20. The two ends of the cantilever support assembly 30 are rotatably connected to the first support and the second support 21, respectively, and the cantilever support assembly 30 extends spirally.

As an example, the first platform 10 is the nacelle platform, and the second platform 20 is the tower platform, but they are not limited thereto. In the present disclosure, by providing a coil pipe device between the nacelle platform and the tower platform, when the nacelle platform rotates relative to the tower platform, the cantilever support assembly 30 can twist spirally, and the cooling pipeline of the liquid cooling system can be disposed on the cantilever support assembly 30. The cooling pipeline is attached to the cantilever support assembly 30 and extends in the same direction as the cantilever support assembly 30 to twist spirally with the cantilever support assembly 30, thus avoiding pulling and squeezing deformation or damage of the hose, thereby improving the usage reliability of the cooling pipeline and the operational reliability of the wind turbine. As an example, the cooling pipeline can be a hose, but is not limited thereto.

Continuing with reference to FIG. 1, the present disclosure discloses an exemplary embodiment. In order to further improve the flexibility of the coil pipe device, the cantilever support assembly 30 includes at least two support joints 31, and adjacent support joints 31 are rotatably connected with each other. This results in a rotatable connection between the adjacent support joints 31, facilitating the spiral torsion of the cantilever support assembly 30.

In the present embodiment, the adjacent support joints 31 can be connected through a pivot shaft 32, but not is limited thereto. As an example, the support joint 31 can be in the shape of a rectangular plate, and the pivot shaft 32 can be disposed on both sides of the support joint 31 along the spiral extension direction of the cantilever support assembly 30, but is not limited thereto. Optionally, the pivot shaft 32 is substantially perpendicular to the cooling pipeline close to the pivot shaft 32, but is not limited thereto.

In order to avoid the adjacent support joints 31 from swinging freely and colliding with adjacent components, the adjacent support joints 31 and the pivot shaft 32 can be formed as a hinge form, allowing the adjacent support joints 31 to swing at a predetermined range of angle.

Optionally, the support joint 31 can be made of carbon steel or stainless steel materials. In order to reduce the weight of the cantilever support assembly 30, a weight reducing hole 314 is provided on the support joint 31. As an example, the weight reduction hole 314 can be a rectangular hole and arranged in the middle of the support joint 31 along the spiral extension direction of the cantilever support assembly 30, but is not limited thereto.

Furthermore, continuing with reference to FIG. 1, in the present embodiment, the first support is located above the second support 21, and the cantilever support assembly 30 further includes a support seat 34. The support seat 34 is rotatably arranged on the second support 21 to support the weight of multiple support joints 31, which are rotatably connected to the support seat 34. In the present embodiment, the support seat 34 can be a rectangular plate, but is not limited thereto. In order to improve the bearing capacity of the support seat 34, the support seat 34 can be made of high-strength structural steel, and the support joint 31 can be made of the aforementioned carbon steel or stainless steel to reduce the manufacturing cost of the cantilever support assembly 30.

Furthermore, in order to be able to connect the cooling pipeline to the cantilever support assembly 30, optionally, the cantilever support assembly 30 further includes an attaching pipe clamp 33, with each support joint 31 connected with at least one attaching pipe clamp 33. The attaching pipe clamp 33 is used to attach the hose to the support joint 31, so that the hose and the cantilever support assembly 30 can be arranged according to the shape. The swing of each support joint 31 will drive the hose to move, improving the motion accuracy of the hose. The present disclosure improves the attaching stability of the cooling pipeline by providing an attaching pipe clamp 33 to stably attach the cooling pipeline to the support joint 31.

In the present embodiment, the attaching pipe clamp 33 is arranged on the inner side or outer side of the cantilever support assembly 30, so that after the cooling pipeline is attached to the coil pipe device, the cooling pipeline is arranged on the inner side or outer side of the cantilever support assembly 30.

In addition, in order to support the cooling pipeline on two sides, that is, the inner side and outer side, of the coil pipe device to improve the force situation of the coil pipe device and thus increase the service life of the coil pipe device, the attaching pipe clamps 33 are provided on both sides of the support joint 31 to enable adjacent support joints 31 to support different cooling pipelines. Specifically, the attaching pipe clamp 33 is substantially U-shaped, and the opening of the attaching pipe clamp 33 can be provided towards the support joint 31, so that the attaching pipe clamp 33 and the support joint 31 can enclose and form a hose accommodating chamber. The hose can be stably disposed in the hose accommodating chamber to avoid accidental detachment of the hose from the support joint 31, thereby improving the usage reliability of the coil pipe device.

In the present embodiment, the end of the U-shaped opening of the attaching pipe clamp 33 is provided with threads, allowing the attaching pipe clamp 33 to be in thread connection with the support joint 31. This allows for a detachable connection between the attaching pipe clamp 33 and the support joint 31, thus facilitating disassembly and assembly. As an example, the attaching pipe clamp 33 can be connected to the support joint 31 through the nut 35, but is not limited thereto.

In addition, the attaching pipe clamp 33 can also be in semi-elliptical or semi-circular shape, but is not limited thereto.

Optionally, the cooling pipeline provided in the present disclosure can be either an inlet pipe 41 or a discharge pipe 42. In the present embodiment, the cooling pipeline can include an inlet pipe 41 and a discharge pipe 42, with the inlet pipe 41 and the discharge pipe 42 extending substantially parallel to each other. In the present embodiment, the inlet pipe 41 and the discharge pipe 42 are arranged at intervals along the extension direction of the pivot shaft 32, as shown in FIG. 1, but is not limited thereto. In addition, the inlet pipe 41 and the discharge pipe 42 are located on both sides of the same pivot shaft 32, that is, one of the inlet pipe 41 and the discharge pipe 42 is attached to the circumferential outer side of the cantilever support assembly 30, while the other is attached to the inner side of the cantilever support assembly 30, which is not shown in the figures. This allows the inlet pipe 41 and the discharge pipe 42 to be respectively located on both sides of the cantilever support assembly 30, allowing the coil pipe device to balance more easily and improving the service life of the coil pipe device. The inner side defined in the present embodiment is the side close to the spiral axis of the cantilever support assembly 30, and the side far from the spiral axis of the cantilever support assembly 30 is the outer side.

As an example, the cooling pipeline is made of rubber hose or silicone hose, but is not limited thereto.

In the present embodiment, the first platform 10 and the second platform 20 are respectively provided with through holes for the cooling pipe to pass through. The cooling pipe extends along the tower, passes through the through hole located on the first platform 10 from below the first platform, is connected to the coil pipe device, passes through the through hole located on the second platform 20 from below the second platform 20 and enters the nacelle.

Figure 3:
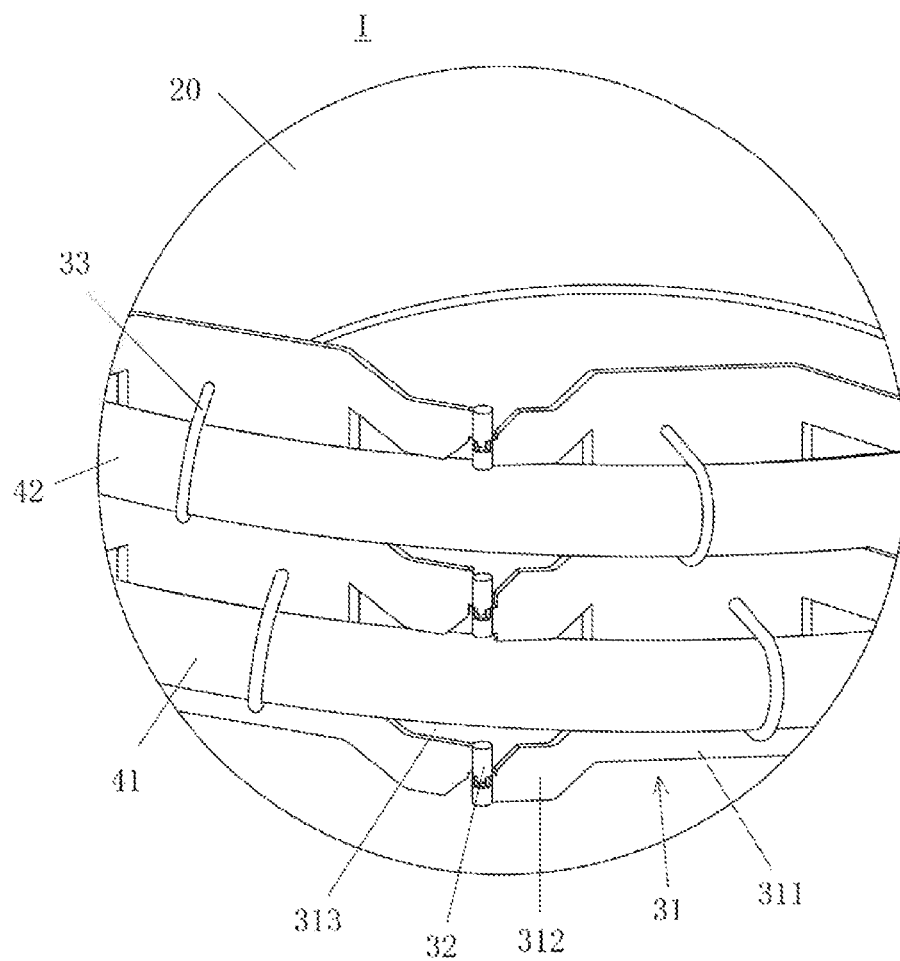
FIG. 3 is a partial enlarged view of the structure indicated by I circle in FIG. 2.
Figure 4:
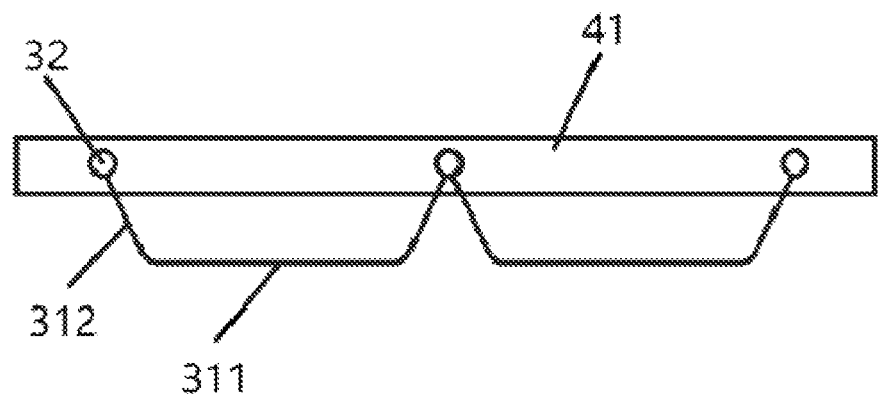
FIG. 4 is a partial structural diagram of the structure in FIG. 3.

FIGS. 2-4 illustrate a partial structural diagram of a liquid cooling system provided in another embodiment of the present disclosure. The structure of the support joint 31 in the present embodiment is unlike the structure in FIG. 1. Specifically, referring to FIGS. 2-4, the support joint 31 includes a body 311 and two bending parts 312. The two bending parts 312 are respectively arranged at two ends of the body 311 along the spiral extension direction and are bent towards the same side. The adjacent support joints 31 are pivotally connected at the bending parts 312 through a pivot shaft 32. As an example, the angle between each bending part 312 and the body 311 is approximately between 110°-170°, but is not limited thereto. Optionally, the angle between each bending part 312 and the body 311 can be 120°, or 135°, or 150°, but is not limited thereto.

In the present embodiment, the pivot shaft 32 is arranged on the bending parts 312, so that the swing angle between the adjacent support joints 31 can be limited by providing the bending parts 312.

It should be explained that the bending parts 312 and the body 311 can be integrally formed, for example, by pressing and bending through metal plate; alternatively, the bending parts 312 and the body 311 can be formed separately and fixed by welding. The present application does not specifically limit the way of providing the bending parts 312 and the body 311.

In the present embodiment, the bending parts 312 of the adjacent support joints 31 are illustrated as being oriented in the same direction, as shown in FIGS. 2-4. In this way, the cooling pipeline can be provided on the same side of the support joint 31, for example but not limited thereto, the cooling pipeline is provided on the inner side or outer side of the support joint 31.

Figure 5:
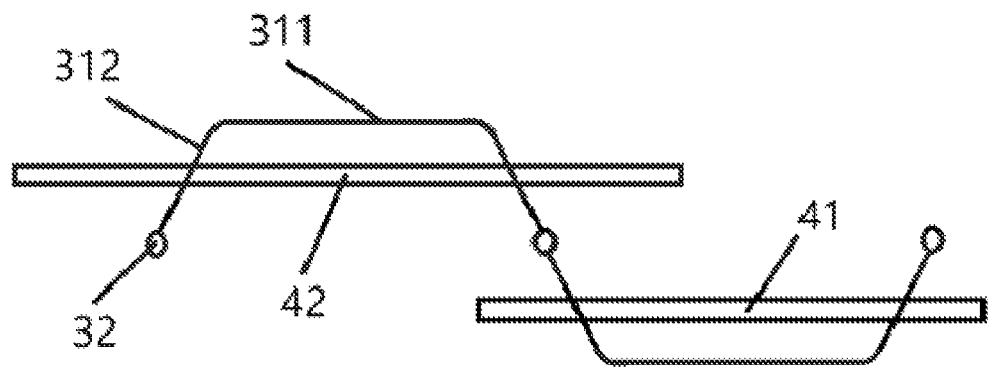
FIG. 5 is a partial structural schematic diagram of the cantilever support assembly provided in another exemplary embodiment of the present disclosure.

In addition, in order to support the cooling pipeline on both sides, that is, the inner side and the outer side, of the coil pipe device to improve the force situation of the coil pipe device and thereby increase the service life of the coil pipe device, as shown in FIG. 5, specifically, the bending parts 312 of the adjacent support joints 31 are assembled to be bent in opposite directions to enable the adjacent support joints 31 to support different cooling pipelines.

As an example, in the coil pipe device provided in the present embodiment, the bending parts 312 of the adjacent support joints 31 are assembled to be bent in opposite directions. This arrangement allows for the bending part 312 of one support joint 31 to be arranged towards the outer side of the cantilever support assembly 30, and the bending part 312 of the support joint 31 adjacent to it to be arranged towards the inner side of the cantilever support assembly 30 after installation. This allows the support joints 31 to be supported on the same cooling pipeline at intervals.

As an example, in the present embodiment, the attaching pipe clamp 33 and the bending parts 312 are arranged on the same side of the body 311, but is not limited thereto. In order to avoid squeezing deformation of the cooling pipeline at the position of the pivot shaft 32, each bending part 312 is provided with a notch 313 for the hose to pass through so that when the cooling pipeline is provided on the cantilever support assembly 30, the cooling pipeline can be in the notch 313.

Referring to FIGS. 3-4, in an optional embodiment of the present application, the pivot shaft 32 includes at least two pivot shaft units spaced apart along its extension direction (three pivot units are shown in FIG. 3, but is not limited thereto), and the notch 313 is provided between adjacent pivot shaft units, such that after the hose is provided on the coil pipe device, the gravity received by the hose is on the centerline of the hose, and the support force provided by the pivot shaft unit is substantially located on the centerline of the hose. The centerline of the hose passes through the pivot shaft, thereby preventing the hose from being squeezed or pulled when the hose bends spirally with the coil pipe device, and improving the reliability of the device.

Specifically, in the present embodiment, there are two notches 313 in each bending part 312, and the two notches 313 are spaced part along the extension direction of the pivot shaft 32. In the case where the liquid cooling system includes an inlet pipe 41 and a discharge pipe 42, the inlet pipe 41 and the discharge pipe 42 are provided at the two notches 313 spaced apart along the extension direction of the pivot shaft 32 respectively. As an example, the notches 313 and the attaching pipe clamps 33 are provided in the spiral circumference, but are not limited thereto.

In addition, in order to support the cooling pipeline on both sides of the coil pipe device to improve the force situation of the coil pipe device and thus increase the service life of the coil pipe device, the attaching pipe clamps 33 and the bending parts 312 are arranged on the same side of the body, and the attaching pipe clamps 33 of the adjacent support joints 31 face differently (not shown in the figures) to enable the adjacent support joints 31 to support different cooling pipelines. As an example, in the coil pipe device provided in the present embodiment, the orientations of the attaching pipe clamps 33 of the adjacent support joints 31 are different, that is, the attaching pipe clamp 33 of one support joint 31 is arranged towards the outer side of the cantilever support assembly 30, and the attaching pipe clamp 33 of the support joint 31 adjacent to it is arranged towards the inner side of the cantilever support assembly 30, so that the support joints 31 can be supported on the same cooling pipeline at intervals.

In the other aspect, the present disclosure provides a liquid cooling system, which includes a cooling pipeline and a coil pipe device as described above. The cooling pipeline is attached to the cantilever support assembly and extends in the same direction as the cantilever support assembly.

In the description of the present disclosure, it should be understood that the terms "center", "up", "down", "front", "back", "left", "right", "vertical", "horizontal", "top", "bottom", "inside", "outside", and other indications of orientation or positional relationships are based on the orientation or positional relationships shown in the accompanying drawings, and are only for the convenience of describing the present disclosure and simplifying the description, instead of indicating or implying that the device or component referred to must have a specific orientation, be constructed and operated in a specific orientation, and therefore cannot be understood as a limitation of the present disclosure.

The terms "first" and "second" are only used for the purpose of the description and cannot be understood as indicating or implying relative importance or implying the quantity of technical features indicated. Therefore, features defined with "first" and "second" can explicitly or implicitly include one or more of these features. In the description of the present disclosure, unless otherwise stated, "multiple" means two or more.

In the description of the present disclosure, it should be noted that unless otherwise specified and limited, the terms "installation", "connected with", "connection", and "fixation" should be understood broadly. For example, they can be fixed connection, detachable connection, or integrated connection, mechanical connection, electrical connection, or communication connection; they can be directly connected or indirectly connected through an intermediate medium, or can be the internal connection between two components or the interaction relationship between two components. For the skilled person in the art, the specific meanings of the above terms in the present disclosure can be understood in specific circumstances.

The features, structures, or characteristics described in the present disclosure may be combined in one or more embodiments in any suitable manner. In the above description, many specific details are provided to provide a full understanding of the embodiments of the present disclosure. However, the skilled person in the art will be aware that the disclosed technical solution can be practiced without one or more of the specific details described, or other methods, components, materials, etc. may be employed. In other cases, the well-known structures, materials, or operations are not shown or described in detail to avoid blurring various aspects of the present disclosure.

What is claimed is:

1. A coil pipe device for supporting a hose, characterized in that the coil pipe device is arranged between a first platform and a second platform spaced apart, with the first platform being rotatable relative to the second platform, the coil pipe device comprises:
   a first support fixed on the first platform;
   a second support fixed on the second platform;
   a cantilever support assembly, wherein two ends of the cantilever support assembly are rotatably connected to the first support and the second support respectively, and the cantilever support assembly extends spirally.

2. The coil pipe device as claimed in claim 1, characterized in that the cantilever support assembly comprises at least two support joints and adjacent support joints are rotatably connected with each other.

3. The coil pipe device as claimed in claim 2, characterized in that the cantilever support assembly further comprises an attaching pipe clamp for attaching the hose to the support joint, and each support joint is connected with at least one attaching pipe clamp.

4. The coil pipe device as claimed in claim 3, characterized in that the attaching pipe clamp comprises an opening, and the opening is arranged towards the support joint, so that the attaching pipe clamp and the support joint enclose and form a hose accommodating chamber.

5. The coil pipe device as claimed in claim 2, characterized in that the adjacent supporting joints are pivotally connected through a pivot shaft.

6. The coil pipe device as claimed in claim 5, characterized in that the adjacent support joints and the pivot shaft are pivotally connected in a form of hinge.

7. The coil pipe device as claimed in claim 5, characterized in that the support joint comprises a body and two bending parts, the two bending parts are respectively arranged at two ends of the body along a spiral extension direction and bent towards a same side, and the adjacent support joints are pivotally connected at the bending parts through the pivot shaft.

8. The coil pipe device as claimed in claim 7, characterized in that each bending part is provided with a notch for the hose to pass through.

9. The coil pipe device as claimed in claim 8, characterized in that the pivot shaft comprises at least two pivot shaft units spaced apart along its extension direction, and the notch is arranged between adjacent pivot shaft units, allowing a centerline of the hose to pass through the pivot shaft.

10. The coil pipe device as claimed in claim 8, characterized in that each bending part is provided with two notches, which are spaced apart along the extension direction of the pivot shaft.

11. The coil pipe device as claimed in claim 7, characterized in that the adjacent supporting joints are assembled with the bending parts bending toward a same direction;
alternatively, the adjacent supporting joints are assembled with the bending parts bending in opposite directions.

12. The coil pipe device as claimed in claim 7, characterized in that an angle between each bending part and the body is between 110° and 170°.

13. The coil pipe device as claimed in claim 2, characterized in that the first support is located above the second support, the cantilever support assembly further comprises a support seat, the support seat being rotatably arranged on the second support, the support joint being rotatably connected to the support seat, a middle part of the support joint being provided with a weight reduction hole.

14. A liquid cooling system, characterized in that the liquid cooling system comprises a cooling pipeline and the coil pipe device as claimed in claim 1, wherein the cooling pipeline is attached to the cantilever support assembly and extends in the same direction as the cantilever support assembly.

15. The liquid cooling system as claimed in claim 14, characterized in that the cantilever support assembly comprises at least two support joints and adjacent support joints are rotatably connected with each other.

16. The liquid cooling system as claimed in claim 15, characterized in that the adjacent supporting joints are pivotally connected through a pivot shaft, and the pivot shaft is substantially perpendicular to the cooling pipeline close to the pivot shaft.

17. The liquid cooling system as claimed in claim 14, characterized in that the cooling pipeline is a hose, and the hose is a rubber hose or a silicone hose.

18. The liquid cooling system as claimed in claim 16, characterized in that the cooling pipeline comprises an inlet pipe and a discharge pipe, and the inlet pipe and the discharge pipe extend substantially parallel to each other.

19. The liquid cooling system as claimed in claim 18, characterized in that the inlet pipe and the discharge pipe are spaced apart along an extension direction of the pivot shaft; or,
the inlet pipe and the discharge pipe are located on both sides of the same pivot shaft.

20. A wind turbine, characterized in that the wind turbine comprises a tower, a nacelle located at a top of the tower, and the liquid cooling system as claimed in claim 14, the first platform being a nacelle platform connected to the nacelle, the second platform being a tower platform connected to the tower, the nacelle platform being rotatable relative to the tower platform.

\* \* \* \* \*